US012588783B2

(12) United States Patent
Fromm

(10) Patent No.: US 12,588,783 B2
(45) Date of Patent: Mar. 31, 2026

(54) MIXER

(71) Applicant: Wayne Fromm, Toronto (CA)

(72) Inventor: Wayne Fromm, Toronto (CA)

(*) Notice: Subject to any disclaimer, the term of this patent is extended or adjusted under 35 U.S.C. 154(b) by 617 days.

(21) Appl. No.: 17/969,657

(22) Filed: Oct. 19, 2022

(65) Prior Publication Data

US 2024/0130567 A1 Apr. 25, 2024
US 2024/0225362 A9 Jul. 11, 2024

(51) Int. Cl.
*A47J 43/08* (2006.01)
*B01F 27/112* (2022.01)
*B01F 23/235* (2022.01)

(52) U.S. Cl.
CPC .......... *A47J 43/082* (2013.01); *B01F 27/112* (2022.01); *B01F 23/235* (2022.01)

(58) Field of Classification Search
CPC .............................. B01F 27/112; B01F 23/235
See application file for complete search history.

(56) References Cited

U.S. PATENT DOCUMENTS

| | | | |
|---|---|---|---|
| 2,564,887 | A | 8/1951 | Ernst |
| 2,932,494 | A | 4/1960 | Wales |
| D191,457 | S | 10/1961 | Saffer |
| 3,285,584 | A | 11/1966 | Goldfarb |
| 3,774,338 | A | 11/1973 | Waak |
| D259,133 | S | 5/1981 | Klawitter |
| 4,549,811 | A | 10/1985 | Schiffner et al. |
| 5,344,234 | A | 9/1994 | Caveza |

| | | | | |
|---|---|---|---|---|
| 5,899,565 | A | * | 5/1999 | Camezon .............. A47J 43/082 |
| | | | | 219/726 |
| 2002/0031047 | A1 | | 3/2002 | Fromm |
| 2002/0186615 | A1 | * | 12/2002 | Wilson .................. A47J 43/044 |
| | | | | 366/199 |
| 2016/0256003 | A1 | | 9/2016 | Altenritter et al. |
| 2016/0354740 | A1 | | 12/2016 | Gonzalez et al. |

(Continued)

FOREIGN PATENT DOCUMENTS

| | | |
|---|---|---|
| CN | 105056822 | 11/2015 |
| CN | 216569647 | 5/2022 |
| WO | 2012080680 | 6/2012 |

OTHER PUBLICATIONS

WO2012080680 to Guilmart machine translation (Year: 2012).*

(Continued)

*Primary Examiner* — Anshu Bhatia
(74) *Attorney, Agent, or Firm* — Chad Peterson

(57) ABSTRACT

A child-friendly mixing apparatus for mixing various food substances is disclosed. The mixing apparatus includes a container with an opening, a lid that fits into the opening, and a mixing assembly. The lid includes a centrally located hole that has curved and/or sloped sides. The mixing assembly includes a housing, a motor within the housing, a mixing attachment that is rotated by the motor, and at least one button that turns the motor on and off. The mixing attachment fits through the lid hole and the lower end of the mixing assembly rests against the curved sides of the lid hole. The button is located on the portion of the mixing assembly that rests against the curved sides of the lid hole, and is automatically actuated when the mixing assembly is put in its operating position. A mixing kit is also disclosed, the mixing kit including a straw adapter and a measuring spoon in addition to the mixing assembly.

16 Claims, 9 Drawing Sheets

(56) References Cited

U.S. PATENT DOCUMENTS

| | | |
|---|---|---|
| 2019/0216257 A1 | 7/2019 | Lui et al. |
| 2021/0086151 A1 | 3/2021 | Bertsch |
| 2022/0183504 A1 | 6/2022 | Garcia |
| 2022/0258961 A1 | 8/2022 | Carbonini et al. |
| 2022/0265082 A1 | 8/2022 | Carbonini et al. |
| 2023/0074503 A1* | 3/2023 | Kanellos .............. B01F 33/86 |

OTHER PUBLICATIONS

Machine Translation (Year: 2012).*
International Search Report and Written Opinion of the International Searching Authority for PCT/CA2024/050290 (10 pages).

* cited by examiner

100

120

108

104     140

160

MIXER

This specification relates generally to food processors and more specifically to mixers easily usable by children. Various types of mixers are known in the art, such as electric powered hand mixers, stand mixers, and others. Some toy mixers are also found in the art. For example, U.S. Pat. No. 3,774,338 discloses a crank-activated toy blender and percolator. The '338 patent, however, does not use electricity, and requires significant manual dexterity to operate.

BACKGROUND

Frothers, which are devices configured to add air bubbles to a liquid, are also known in the art. Prior art electric frothers are typically hand-held devices that include a motor, an on/off switch, and a frothing element. When the frother is turned on, the motor rotates the frothing element, adding air bubbles to the liquid. An alternative prior art frother (e.g., U.S. Patent Publication No. 2019/0216257 to Lui et al.) incorporates air into the liquid through injection of steam.

However, the mixers and frothers in the art are generally not child friendly, in that they require manual dexterity (e.g., in holding steady a hand mixer or frother while the motor is running), constant physical pressure on a button or other element (e.g., pushing a button to activate the mixing or frothing motion, such as the rotation of the frothing element), and/or A/C power. Some mixers and frothers may be dangerous for children to operate, because of the use of steam, rapidly spinning blades, etc.

There remains a need for a child-friendly mixer that is easy to use, does not require significant manual dexterity or constant pressure, and is battery-powered to prevent risk of electric shock. It would be beneficial if the mixer is capable of mixing a wide variety of ingredients, including, e.g., liquids (e.g., milk, water, juice, etc.), flavored powders, dairy products (e.g., yogurt, ice cream, etc.), non-dairy milks (e.g., plant-based milks, such as almond or soy milk), non-dairy yogurts, non-dairy frozen products, fruits, etc., and of frothing various liquids.

SUMMARY

In accordance with the foregoing objectives and others, exemplary mixers are disclosed herein that are child-friendly and do not require the user to apply manual pressure to any element of the mixer.

One embodiment is directed to a mixer comprising: a container for holding one or more items to be mixed, the container comprising a top end and a bottom end, the bottom end configured to be placed on a flat surface, the top end comprising an opening, the container defining an inside volume; a lid configured to substantially cover the opening of the container, the lid comprising a hole through which the volume inside the container can be accessed; and a mixing assembly comprising: a housing configured to interface with the hole in the lid; a motor disposed within the housing; a power source configured to provide power to the motor; a switch for controlling the motor, the switch disposed on the housing; and a mixing element directly or indirectly attached to the motor, wherein the mixing element is sized to fit through the hole in the lid; wherein the switch is disposed on the housing in a location that causes the switch to be actuated when the mixing assembly interfaces with the hole in the lid and the force of gravity is applied to the mixing assembly.

Another embodiment is directed to a mixer kit, comprising: a mixer as recited above; and a straw adapter, the straw adapter configured to fit into the hole of the lid of the mixer, the straw adapter comprising a centrally located hole sized to fit a conventional straw.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various embodiments are disclosed herein to provide a mixer that uses the force of gravity to operate the mixer when the parts of the mixer are in an operational position. Unlike conventional mixers, the disclosed mixers eliminate the need for application of manual pressure on any element of the mixer, while still remaining easy to use and safe for children. The disclosed mixers are also impact and shatter-resistant.

Figure 1:
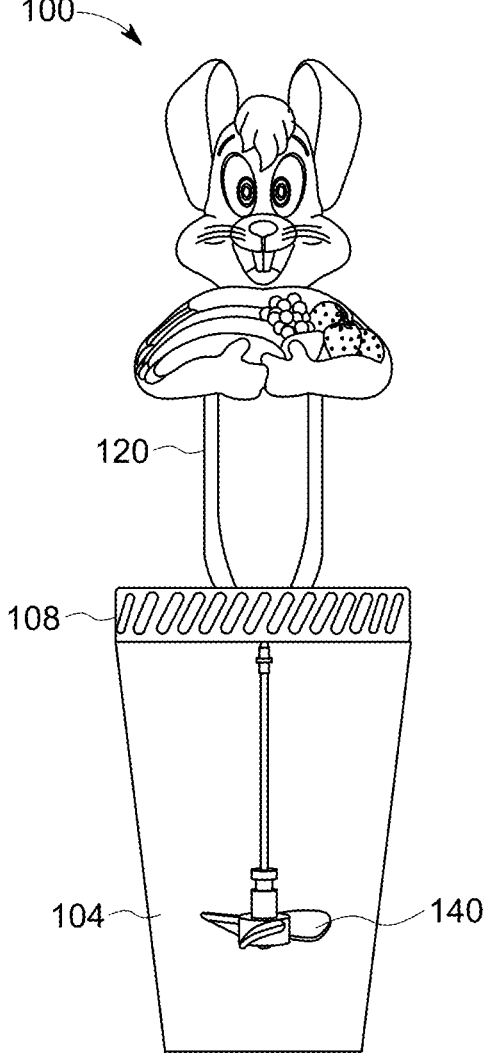
FIG. 1 illustrates an embodiment of a mixer in an operational position.

As used herein, bottom and top and lower and upper refer to the normal operating position of the mixer, e.g., as illustrated in FIG. 1. In the following disclosure, examples of mixing drinks are primarily used, but the mixer may be used to mix other types of food substances, for example puddings, dairy products (e.g., ice cream and yogurt), non-dairy yogurts, non-dairy frozen products, etc. The mixer may also be used to froth liquids and even mix non-food substances. However, in preferred embodiments all materials are food safe.

Figure 2:
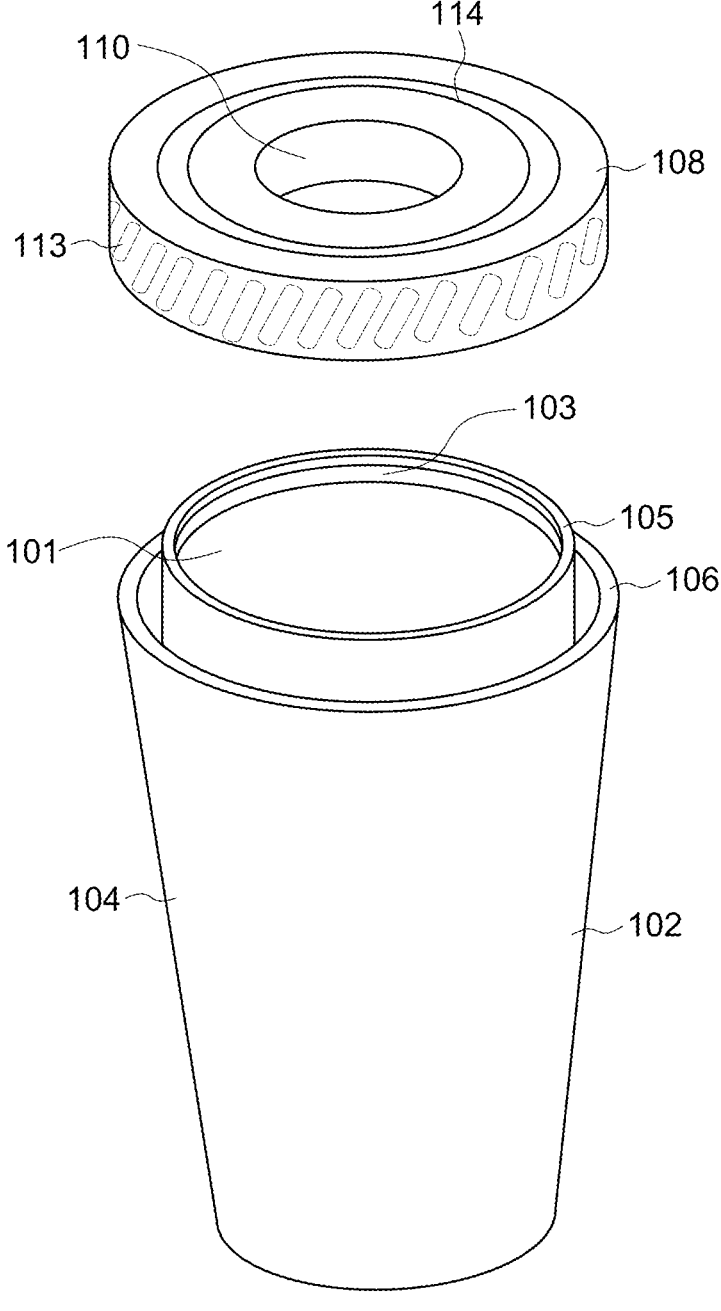
FIG. 2 illustrates an embodiment of a container and lid of a mixer.
Figure 3:
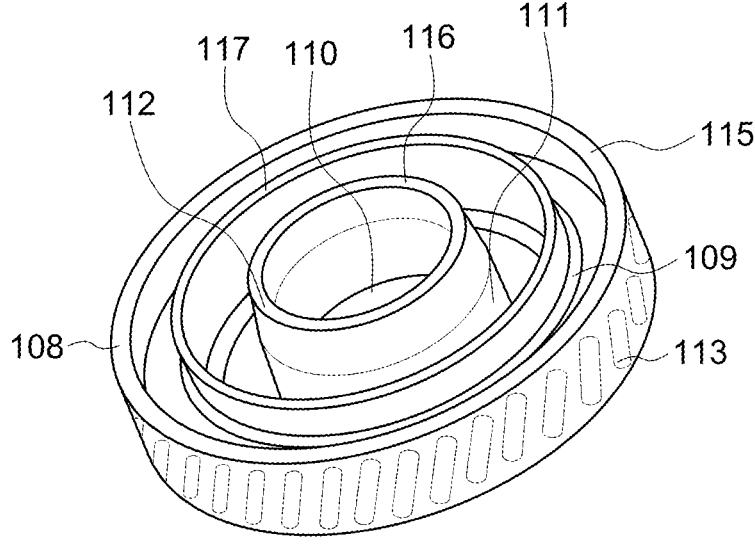
FIG. 3 illustrates an additional view of an embodiment of a lid of a mixer.
Figure 4:
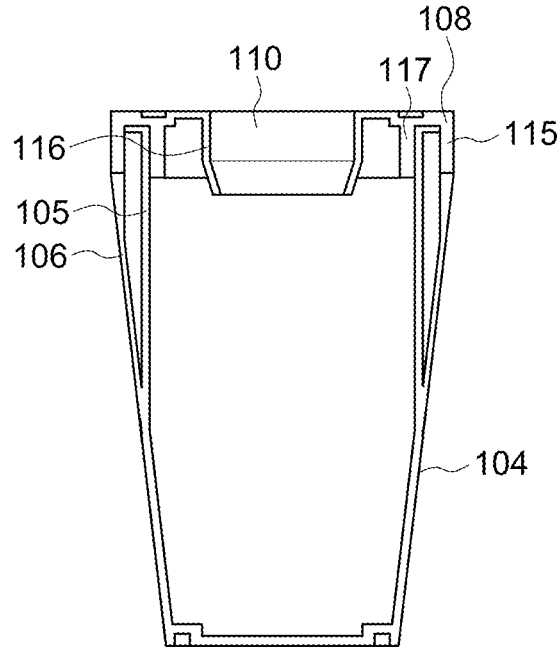
FIG. 4 illustrates a cutaway view of an assembled container and lid.

Referring now to FIGS. 2 through 4, one embodiment of a mixer 100 is illustrated. The mixer includes a container 104, a lid 108, and a mixing assembly 120. The container is roughly cylindrical in shape, with the top of the container having a larger diameter than the bottom. The bottom of the container is closed and shaped to enable the container to rest on a substantially flat surface. The top of the container 104 is open. In an embodiment, the container is primarily or mostly cylindrical. In an alternative embodiment, the top of the container has a larger diameter than the bottom, giving the container a partly conical shape.

The container 104 has an inside surface 101 and an outside surface 102. In an embodiment, the upper part of the inside surface 101 includes a threaded portion 103 for securing the lid 108 thereto. The lid 108 includes a matching threaded portion 109.

In a particular embodiment, the container 104 has an inner wall 105 and an outer wall 106, which (as best seen in FIG.

4) merge together about halfway down the height of the container. In this embodiment, the threaded portion 103 is disposed on the inside surface of the inner wall 105.

The lid 108 is roughly disc-shaped, and includes a threaded edge 109 and a hole 110. The lid 108 is sized to accommodate a secure seal between the container and the lid. The fit of the lid to the container is secure enough to prevent the escape of food particles and/or liquids during normal use of the mixer. In an embodiment, the outer edge 113 of the lid may be textured (e.g., it may have grip lines) or may include a grip mold to aid the user in gripping.

In an alternative embodiment, the lid may be a snap-on flexible lid. As above, the lid is configured to accommodate a food-secure seal between the container and the lid Marshalled though the middle of the lid 108 is a hole 110 sized to accommodate various food powders, such as drink mixes, pudding mixes, etc. The hole 110 is also sufficiently large in diameter to enable the pass-through of mixing attachment 136. As best seen in FIGS. 3 and 4, the hole has curved and/or sloped sides. In an embodiment, the sides of the hole comprise two sections, an upper section 111 and a lower section 112. The upper section 111 and lower section 112 may be sloped or curved at various angles or curvatures to provide an interface for the lower end 127 of the mixing assembly housing 124.

In a particular embodiment, the lid 108 comprises a roughly circular upper disc 114 with a centrally-located hole 110. Extending downward from the disc 114 are three cylindrical walls, an outer wall 115, an inner wall 116, and an intermediate wall 117. The inner wall 116 includes an upper section 111 and a lower section 112, which may be sloped or curved at various angles or curvatures. The lower section 112 is angled more inward (toward the hole 110) than then upper section 111, providing a structure on which the housing 124 of the mixing assembly 120 rests.

In this embodiment, the threaded portion 109 is disposed on the intermediate wall 117 on its outside surface. Further, the outside surface 113 of the outer wall 115 includes a textured surface and/or a grip mold for ease of handling. The outer and intermediate walls (115, 117) extend downwards a sufficient length to interface with the outer wall 106 and inner wall 105 of the container 104, respectively.

The container and lid may be made of any suitable material, e.g., food-safe plastic, etc. In an embodiment, the material may be impact- and/or shatter-resistant. In an embodiment, the container may be transparent or substantially translucent for easy viewing of the mixing process.

FIG. 4 illustrates a cutaway view of the lid 108 and container 104 assembly, where the lid 108 is screwed in place.

Figure 5:
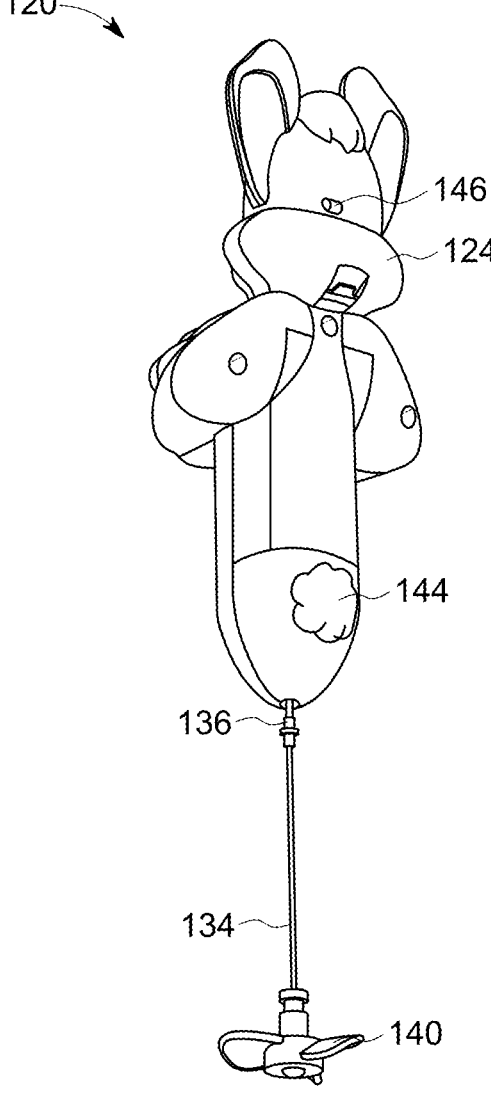
FIG. 5 illustrates an embodiment of a mixing assembly.
Figure 6:
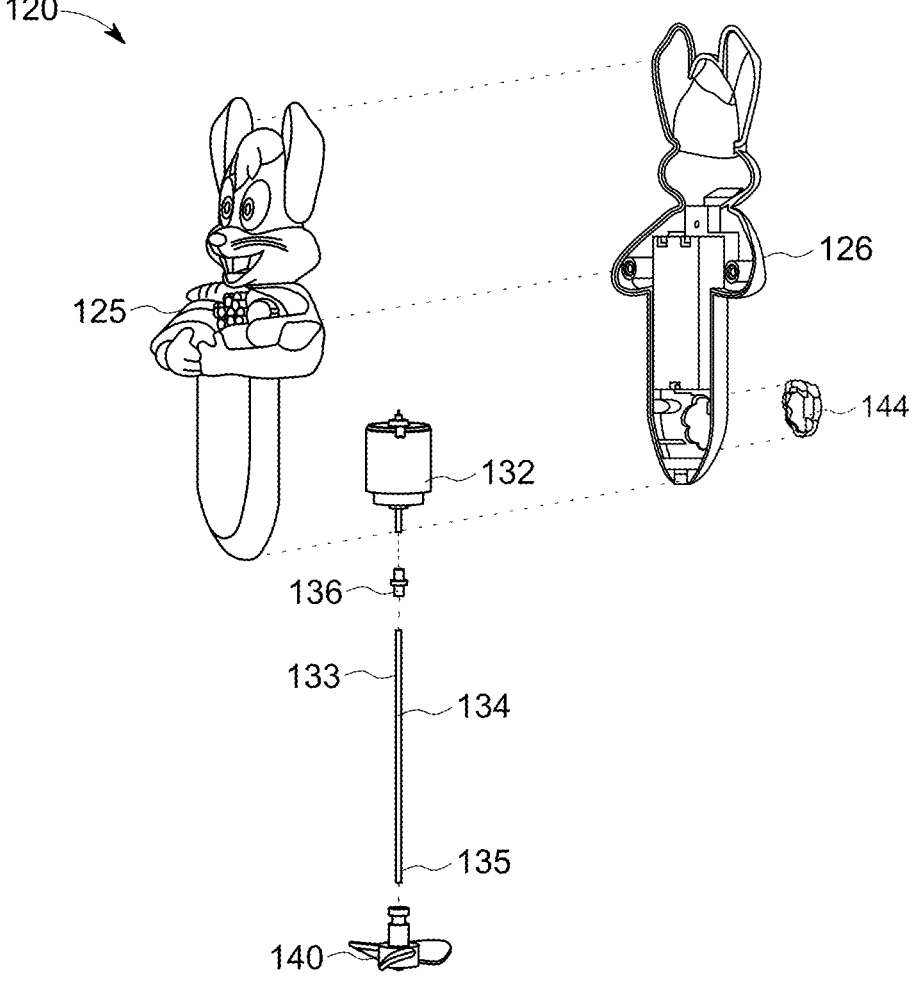
FIG. 6 illustrates an exploded view of a mixing assembly.

FIGS. 5 and 6 illustrate assembled and exploded views respectively of a mixing assembly, The mixing assembly 120 includes a housing 124, a power source (not shown), a motor 132, a rod 134, a mixing attachment 140, an activation switch 144, and an optional on/off switch 146.

The housing 124 may be separated into two or more pieces (125, 126) for ease of manufacturing and/or assembly. If so, the pieces may be joined using any suitable attachment means, e.g., screws, glue, etc. The housing may be made of any suitable material, e.g., plastic. In an embodiment, the housing may be made of an impact- and/or shatter-resistant material.

In an embodiment, the housing 124 may be formed in a kid-friendly shape, e.g., an animal (e.g., a rabbit, reptile, dinosaur, etc.), an insect (e.g., butterfly, ladybug, etc.), an anthropomorphic animal, a mythological creature (e.g., a unicorn, etc.), a cartoon or comic character, a fantasy character (e.g., a wizard), a sports player, a non-sports celebrity, an object related to sports (e.g., football, etc.), various types of foods (e.g., vegetables, fruits, etc.), etc. Any shape that may be of interest to children is contemplated to be within the scope of this invention.

The power source drives the motor 132, and may comprise a battery (e.g., alkaline), rechargeable battery (e.g., lithium ion, lithium ion phosphate, etc.), or other portable power source. The battery is preferably located in the lower section 127 of the housing 124 to lower the center of gravity of the mixing assembly, which helps balance the mixing assembly during operation.

The rod 134 comprises a first end 133 and a second end 135. The first end 133 is configured to attach to the motor, directly or indirectly (e.g., using an adapter 136). The rod may be made of any suitable material, e.g., metal, plastic, etc., and is sized to place the mixing attachment 140 at the desired position in the container 104. In a particular embodiment, the rod may be a plastic-coated metal (e.g., steel) rod.

In an embodiment, the desired position of the mixing attachment may be based on the amount of cyclonic action the mixing attachment induces during operation between the bottom of the mixing attachment and the bottom of the container, e.g., sufficient cyclonic action to mix liquids, puddings, dairy products (e.g., ice cream and yogurt), non-dairy yogurts, non-dairy frozen products, etc. In a particular embodiment, the position of the mixing attachment may be approximately 15 mm to approximately 25 mm above the bottom of the container (measured between the bottom of the container and the bottom of the mixing attachment). In a more particular embodiment, the position of the mixing attachment may be approximately 20 mm above the bottom of the container.

The mixing attachment 140 is attached to the second end 135 of the rod 134, and may comprise a frother, a beater, a paddle mixer, or any other type of attachment that can be used for mixing. The mixing attachment may be made of any suitable material, e.g., metal, plastic, rubber, etc. The mixing attachment may be removable from the rod to enable switching of attachments for various mixing tasks. Generally, the mixing attachment is sized to fit though the lid hole 110. In an embodiment, the mixing attachment may be sized to reach the inside walls of the container when the mixing assembly is in an operational position.

In an embodiment, the rod 134 and mixing attachment 140 are removable from the mixing assembly for convenient cleaning and replacement.

In an embodiment, the rod 134 and mixing attachment 140 are combined into a single element. In another embodiment, the rod 134, mixing attachment 140, and adaptor 136 are combined into a single element. In any of these embodiments, the single combined element may comprise any suitable material, e.g., metal, plastic, plastic-coated metal, rubber or silicone coated metal, etc.

The activation switch 144 is configured to turn the motor 132 on and off. in an embodiment, the activation switch may be any type of switch that can be activated through the application of pressure, e.g., a pushbutton switch, a pressure switch, a friction switch, etc. When sufficient pressure is applied to the switch 144, the motor 132 will be activated. The amount of pressure required to actuate the switch 144 may be configured to be substantially similar to the amount of pressure applied to the switch 144 when the mixing assembly is in an operational position, thus allowing the motor 132 to be turned on merely by inserting the mixing attachment of the mixing assembly through the lid hole 110 and placing the lower end 127 of the housing against the sides of the lid hole.

Alternatively, the activation switch 144 may be a light sensitive switch that activates when the switch is covered, or a magnetic switch that is engaged when in proximity to a magnetic field, such as may be produced by a magnet (or other source of a magnetic field) disposed within the sides of the lid hole.

The on/off switch 146 is configured to turn the motor 132 on and off, and may comprise any type of switch, e.g., a pushbutton switch (preferably located in the upper end of the housing 124), a recessed pushbutton switch, a sliding switch, etc. In an embodiment, the on/off switch may be an internal rotational switch, which is activated by rotation of a portion of the housing. In such an embodiment, the housing may comprise additional sections for ease of assembly.

The on/off switch 146 (if present) and the pressure or friction switch 144 control the operation of the motor in a conventional manner. In an embodiment, the motor will only activate if both switches are actuated. This enables a user to prevent accidental activation of the motor, e.g., when the mixing assembly is placed in a kitchen drawer for storage. For example, when in storage, the on/off switch may be set to the 'off' position, so if the pressure switch 144 is pressed, the motor will not activate. The on/off switch can be set to 'on' when the mixer is being used.

If the on/off switch is not present, the pressure switch 144 may be configured to have a mechanical locking mechanism. In on such embodiment, the pressure switch 144 is round, and can be rotated to mechanically lock the switch, e.g., to prevent it from being pressed and thus activating the motor 132. In this embodiment, the pressure switch can be set to the locked position prior to storage.

The lower end of the housing 127 has sloped or curved sides that interface with the sides of lid hole 110, but also allow for some pivoting movement, e.g., to allow the mixing element to be pivoted to allow the mixing attachment to reach the sides of the container.

Figure 10:
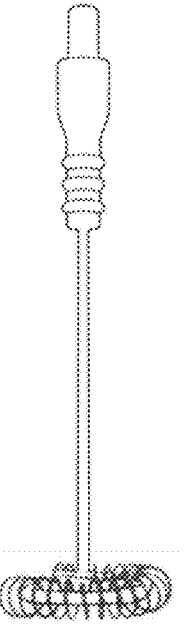
FIG. 10 illustrates an embodiment of a frothing whisk.

The mixer of the disclosed embodiments may be used with a variety of items, such as off the shelf flavored drinks, e.g., powdered flavored milk mixes, mixed with milk, water or another liquid; pudding mixes mixed with liquid; fruit juices; etc. With the appropriate mixing attachment, e.g., a frother (illustrated in FIG. 10), the disclosed mixer may also be used to add air bubbles to a liquid such as milk.

In operation, a user puts the lid 108 on the container 104 and pours items to be mixed (e.g., drink powders, pudding mixes, liquids, etc.) through the lid hole 110. The user then inserts the mixing attachment of the mixing assembly through the lid hole 110 and rests the lower end of the mixing assembly housing 124 on the lid hole sides, which as described herein are curved or sloped in a manner to hold the lower end of the housing. When the mixing attachment is in the operational position, the pressure switch 144 is automatically actuated, causing rotation of the mixing attachment and thereby mixing the contents of the container. The curvature and/or slope of the lid hole sides 110, and the corresponding curvature and/or slope of the lower end of the housing 124, enable the mixing assembly to be pivoted and/or rotated to aid in the mixing process. The disclosed mixer is easy for a child to use and achieve satisfying results, and will encourage independence.

Figure 7:
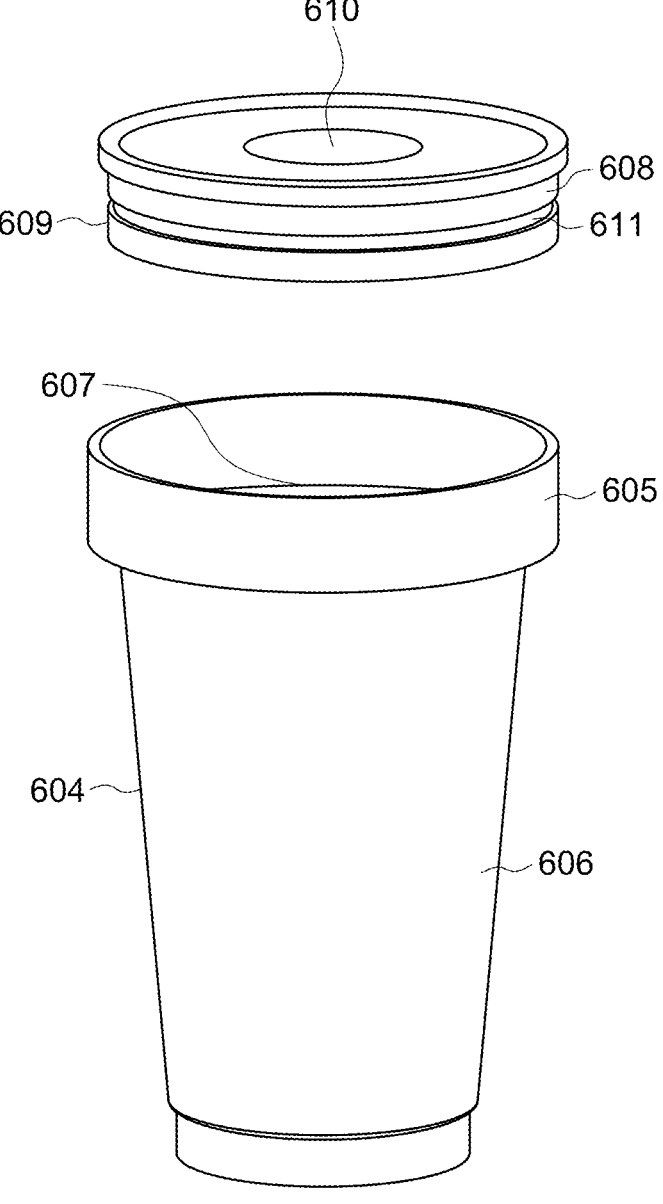
FIG. 7 illustrates an alternative embodiment of a container and a lid.

An alternative embodiment of the container is illustrated in FIG. 7, with the container having sloping sides. The container 604 comprises an upper portion 605 and a lower portion 606. The lower portion 606 has sloping sides, with the bottom having a smaller diameter that the top. The sides of the upper portion 605 are substantially straight. Also, the upper portion 605 of the container protrudes outward from the lower portion 606, on both the inside and the outside, creating a ledge 607 on which the lid 608 rests.

The lid 608 is roughly disc-shaped, and includes an outer edge 609 and a hole 610. The lid 608 is sized to enable the outer edge of the lid to securely fit to the top of the container 604, creating a friction seal. The fit of the lid to the container is secure enough to prevent the escape of food particles and/or liquids during normal use of the mixer.

In an embodiment, the lid outer edge 609 includes a groove 613 around its circumference. The groove is sized to accommodate a rubber seal or gasket (e.g, a O-ring, etc.) to aid in providing a secure fit between the lid and the container.

Figure 8:
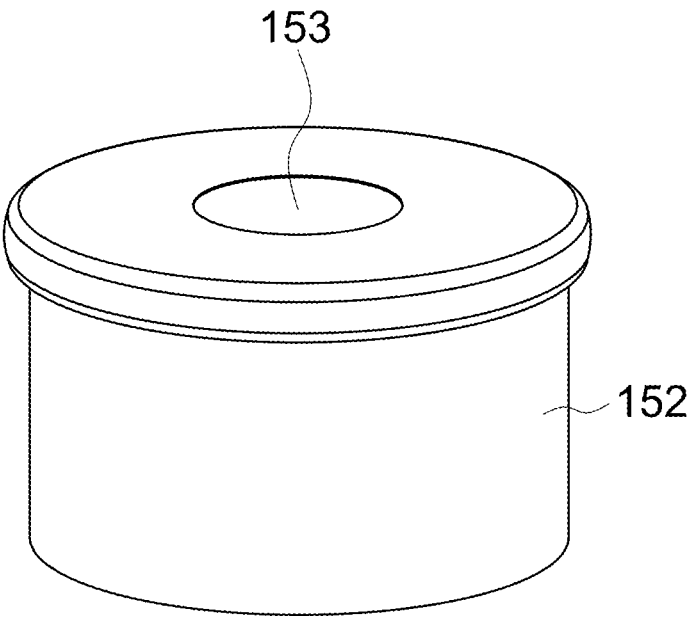
FIG. 8 illustrates an embodiment of a straw adapter.
Figure 9:
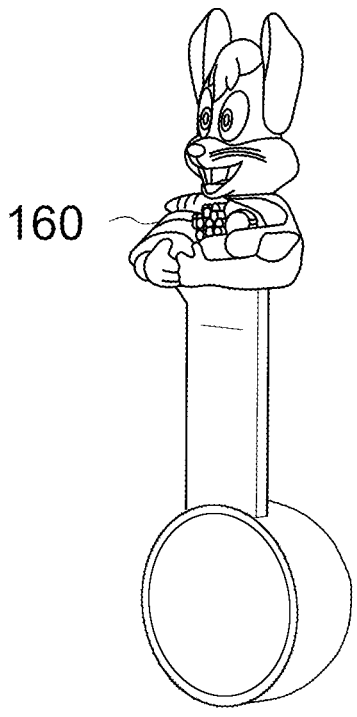
FIG. 9 illustrates an embodiment of a measuring spoon.

In an embodiment, the mixer may be provided to a user as part of a mixer kit. An example mixer kit includes the mixing assembly 120, the container 104, the lid 108, a straw adapter 152 as illustrated in FIG. 8, and a measuring spoon 160 as illustrated in FIG. 9. The measuring spoon 160 is sized to fit into the lid hole 110, and may be used to measure powders or liquids in appropriate quantities for mixing.

The straw adapter is configured to fit in the lid hole 110, and has a centrally-located hole 153 that is sized to accommodate a straw. After the drink is sufficiently mixed, the user can remove the mixing assembly 120 from the lid and insert the straw adapter 152 into the lid hole 110. A straw can then be inserted into the straw hole 153 to ingest the mixed beverage. Alternatively the mixed liquid can be poured into separate containers and refrigerated to form a pudding or placed in a freezer to make frozen treats.

While specific embodiments of a mixer have been disclosed herein, one of ordinary skill in the art will recognize that variations on the disclosed embodiments may be used for the same purpose. For example, the power source may also comprise an A/C adapter. Other variations have been discussed above.

Various embodiments are described in this specification, with reference to the details discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one of ordinary skill in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those of ordinary skill in the art, and such modifications are also intended to fall within the scope of the claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications, and publications cited herein are incorporated by reference in their entirety and for all purposes to the same extent as if each individual patent, patent application, or publication was specifically and individually indicated to be incorporated by reference in its entirety for all purposes.

What is claimed is:

1. A mixer comprising:
   a container for holding one or more items to be mixed, the container comprising a top end and a bottom end, the bottom end configured to be placed on a flat surface, the top end comprising an opening, the container defining an inside volume;
   a generally disc-shaped lid configured to substantially cover the opening of the container, the lid comprising a hole through which the volume inside the container can be accessed, wherein the hole in the lid is disposed in the center of the disc and has sloped or curved sides; and
   a mixing assembly comprising:
      a housing configured to interface with the hole in the lid;
      a motor disposed within the housing;
      a power source configured to provide power to the motor; and
      a mixing element directly or indirectly attached to the motor, wherein the mixing element is sized to fit through the hole in the lid;
      wherein the housing comprises at least a first end, wherein the first end is configured to interface with the hole in the lid, wherein the first end comprises a sloped or curved portion that interfaces with the sloped or curved sides of the hole in the lid.

2. The mixer of claim 1, wherein the housing is configured in a shape of interest to children.

3. The mixer of claim 1, wherein the mixing element comprises a rod and a mixing attachment, the rod comprising a first end and a second end, the first end configured to directly or indirectly connect to the motor, the second end configured to connect to the mixing attachment.

4. The mixer of claim 3, wherein the mixing attachment comprises plastic paddles.

5. The mixer of claim 3, wherein the mixing attachment comprises a frothing whisk.

6. The mixer of claim 1, further comprising a second switch for controlling the motor, wherein the motor is activated when both the switch and the second switch are actuated.

7. The mixer of claim 1, wherein the hole in the lid is sized to accommodate the passage of drink powders and pudding mixes.

8. The mixer of claim 1, wherein the housing comprises at least a first end, wherein the first end is configured to interface with the hole in the lid, wherein the power source is disposed within the housing proximate the first end.

9. The mixer of claim 8, wherein the power source comprises a battery.

10. The mixer of claim 1, where the container comprises at least two sections, and where at least one of the at least two sections has sloped sides.

11. A mixer kit, comprising:
   a mixer as recited in claim 1;
   a straw adapter, the straw adapter configured to fit into the hole of the lid of the mixer, the straw adapter comprising a centrally located hole sized to fit a conventional straw; and
   a measuring spoon sized to fit into the hole of the lid of the mixer to deposit measured powder or liquid portions.

12. A mixer comprising:
   a container for holding one or more items to be mixed, the container comprising a top end and a bottom end, the bottom end configured to be placed on a flat surface, the top end comprising an opening, the container defining an inside volume;
   a generally disc-shaped lid configured to substantially cover the opening of the container,
   the lid comprising a hole through which the volume inside the container can be accessed,
   wherein the hole is disposed in the center of the disc and has sloped or curved sides; and
   a mixing assembly comprising:
      a housing configured to interface with the hole in the lid;
      a motor disposed within the housing;
      a power source configured to provide power to the motor;
      a switch for controlling the motor, the switch disposed on the housing; and
      a mixing element directly or indirectly attached to the motor, wherein the mixing element is sized to fit through the hole in the lid;
      wherein the switch is disposed on the housing in a location that causes the switch to be actuated when the mixing assembly interfaces with the hole in the lid and the force of gravity is applied to the mixing assembly;
      wherein the housing comprises at least a first end, wherein the first end is configured to interface with the hole in the lid, wherein the first end comprises a sloped or curved portion that interfaces with the sloped or curved sides of the hole in the lid.

13. The mixer of claim 12, wherein the switch is disposed on the sloped portion of the first end.

14. The mixer of claim 13, wherein the switch is a push-button switch.

15. The mixer of claim 14, wherein the pressure required to actuate the push-button switch and the weight of the mixing assembly are configured so as to cause the switch to be actuated when the mixing assembly and the container are in an upright position, the first end of the mixing assembly is interfaced with the hole of the lid, and the mixing assembly is under the influence of gravity.

16. A mixer comprising:
   a container for holding one or more items to be mixed, the container comprising a top end and a bottom end, the bottom end configured to be placed on a flat surface, the top end comprising an opening, the container defining an inside volume;

a lid configured to substantially cover the opening of the container, the lid comprising a hole through which the volume inside the container can be accessed; and a mixing assembly comprising:

a housing configured to interface with the hole in the lid;

a motor disposed within the housing;

a power source configured to provide power to the motor;

a switch for controlling the motor, the switch disposed on the housing; and a mixing element directly or indirectly attached to the motor, wherein the mixing element is sized to fit through the hole in the lid;

wherein the switch is disposed on the housing in a location that causes the switch to be actuated when the mixing assembly interfaces with the hole in the lid and the force of gravity is applied to the mixing assembly;

further comprising a second switch for controlling the motor, wherein the motor is activated when both the switch and the second switch are actuated;

wherein the second switch is actuated by rotation of at least a portion of the housing.

* * * * *